April 18, 1961  G. B. NICHOLS  2,979,768
APPARATUS FOR EXTRUSION OF PLASTICS
Filed Feb. 21, 1957  9 Sheets-Sheet 1
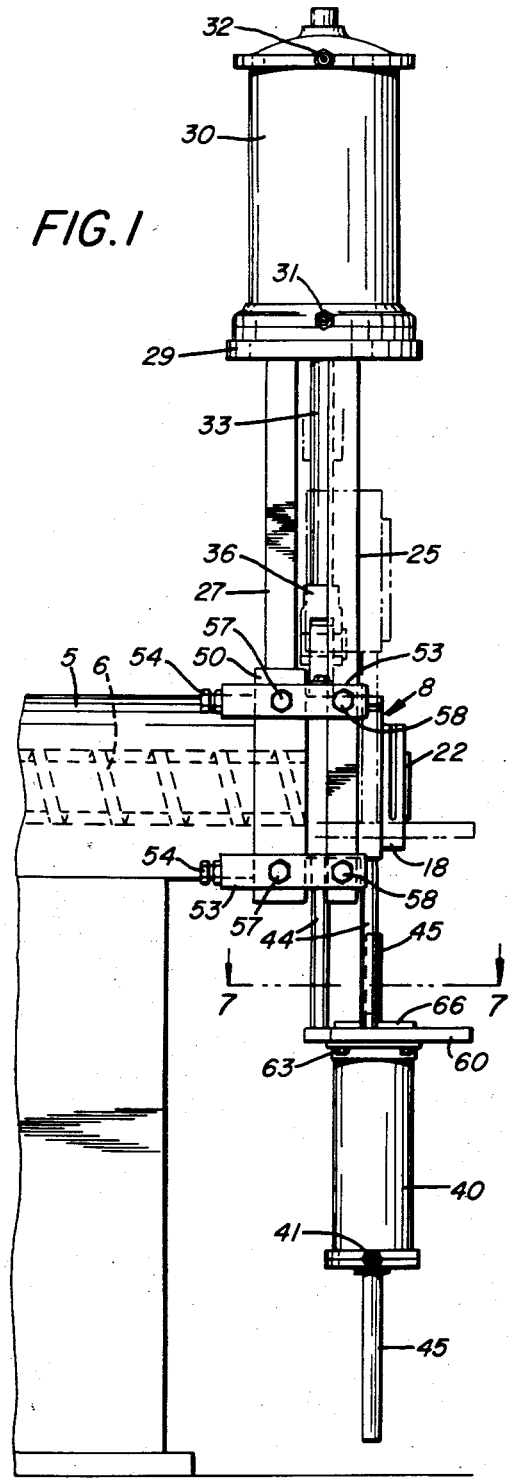
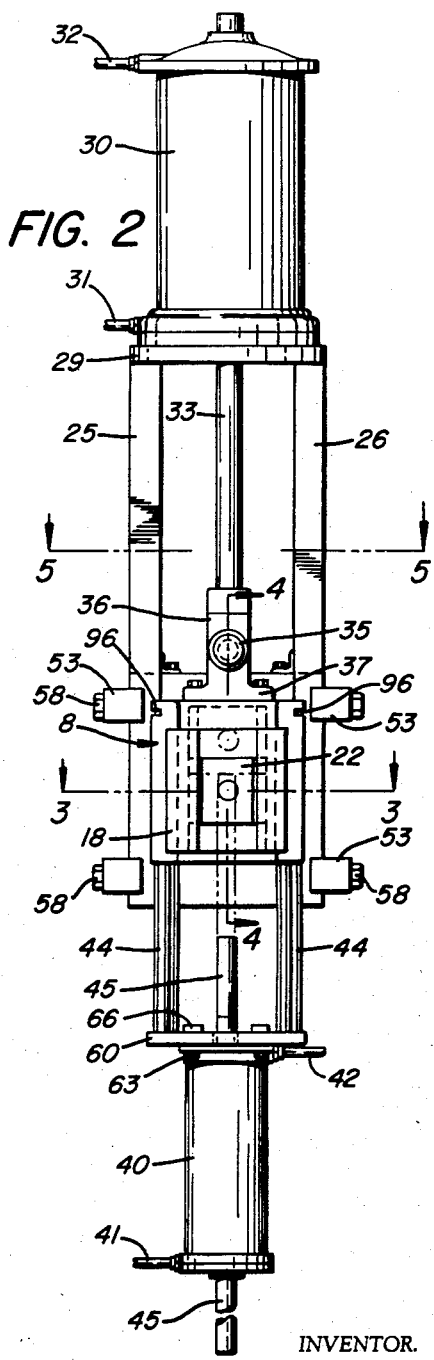
INVENTOR.
GEORGE B. NICHOLS
BY
ATTORNEY

INVENTOR.
GEORGE B. NICHOLS
BY
ATTORNEY

April 18, 1961 G. B. NICHOLS 2,979,768
APPARATUS FOR EXTRUSION OF PLASTICS
Filed Feb. 21, 1957 9 Sheets-Sheet 6

INVENTOR.
GEORGE B. NICHOLS
BY
ATTORNEY

April 18, 1961  G. B. NICHOLS  2,979,768
APPARATUS FOR EXTRUSION OF PLASTICS
Filed Feb. 21, 1957  9 Sheets-Sheet 7

INVENTOR.
GEORGE B. NICHOLS
BY
ATTORNEY

INVENTOR.
GEORGE B. NICHOLS
ATTORNEY

United States Patent Office 2,979,768
Patented Apr. 18, 1961

2,979,768
APPARATUS FOR EXTRUSION OF PLASTICS

George B. Nichols, 159 Homewood, Barberton, Ohio, assignor of one-half to Robert F. Schnee, Barberton, Ohio Filed Feb. 21, 1957, Ser. No. 641,601

15 Claims. (Cl. 18—12)

This invention relates to improvements in apparatus for extrusion of plastics.

One important improvement in plastic extrusion devices as contemplated by this invention is a slidably mounted head which includes the extrusion orifice, and the process of extruding in which the thread of plastic between the extrusion screw and the orifice is sheared off by movement of the head, either to change the orifice or to change the plastic being extruded. Regardless of the reason for which the thread of plastic is thus sheared, the part of the thread in the extruder head can be removed backwardly and intact. If the extrusion means includes a spider, the spider is removed from the head backwardly. Various advantages in this will be obvious from the further description contained herein.

The invention includes means for slidably mounting a die holder in the front of the extruder head, and for sliding a die in this die holder. The die holder and the die are slid perpendicularly to the axis of the screw. This is preferably done by a power cylinder, such as a pneumatic cylinder, which is mounted on the extruder head.

The improvements described herein facilitate the changing of the extrusion orifice and the removal of unextruded plastic from the extrusion head, etc., and greatly reduce the time required for changing the extrusion orifice, and removing unextruded plastic from the equipment when the operation is changed over to extrusion of a different plastic. The various improvements and advantages of this invention will be evident from the drawings and description which follows.

The invention is applicable to the extrusion of various plastics including unvulcanized rubbers, vinyl compounds, cellulosic derivatives, etc.

The improvements in the apparatus are applicable to various types of plastic extrusion devices, as are also the improvements in the methods. The invention will be described more particularly in connection with an extrusion device provided with a single-pitch screw of uniform diameter. It is applicable also to extruders include tapering screws, and those which include multiple-pitch screws. The drawings illustrate the invention in connection with only certain types of die means and one spider, but it is to be understood that the die means and spider illustrated and discussed are examples of different types of extrusion blocks which may be employed, and the invention is not limited thereto.

The invention is explained in connection with the accompanying drawings, in which:

Fig. 1 is a side elevation of the front of a plastic extrusion device equipped with certain of the improvements of the invention;

Fig. 2 is a front view of the same;

Figure 3:
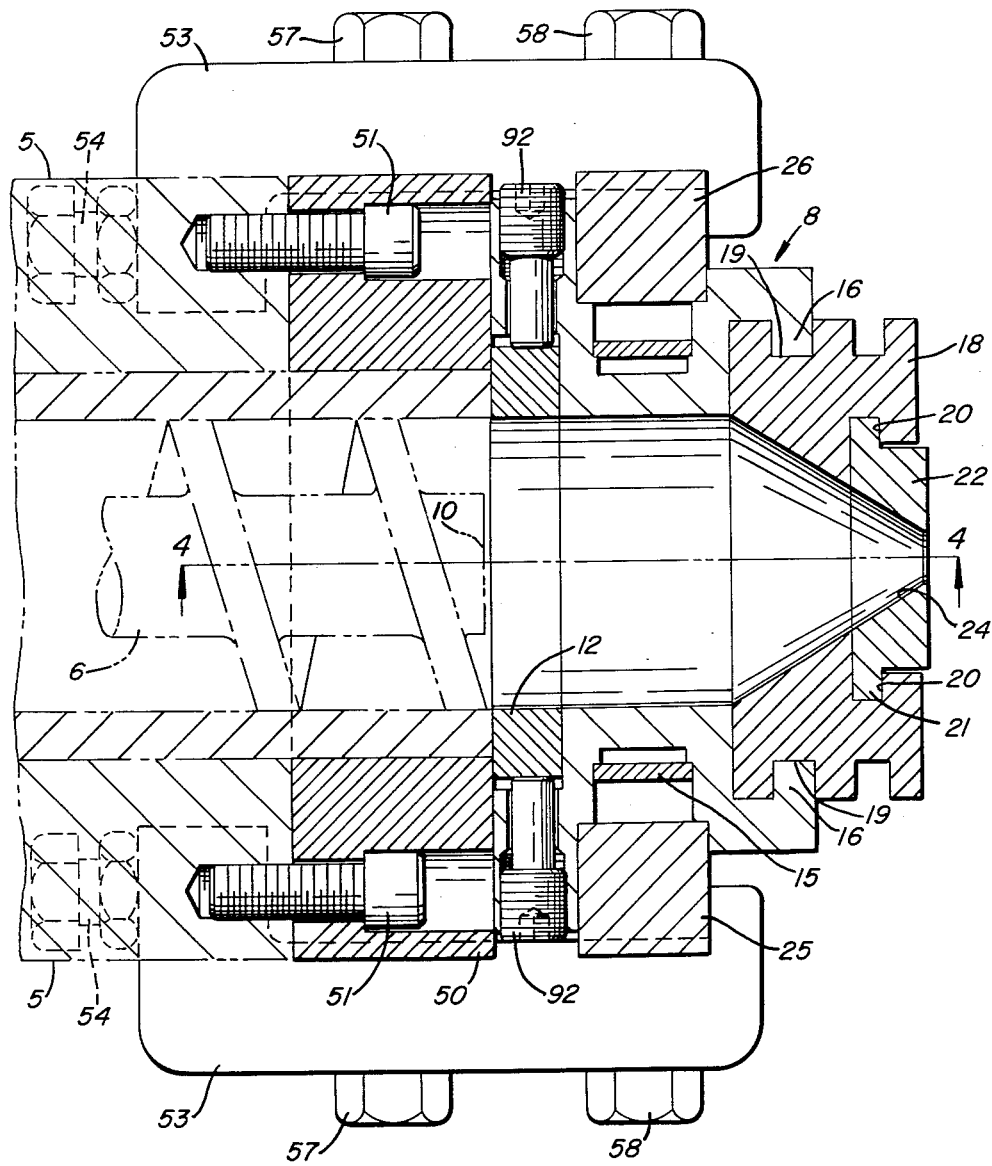
Fig. 3 is a horizontal section through the extrusion die, die holder, and head on the line 3—3 of Fig. 2.
Figure 4:
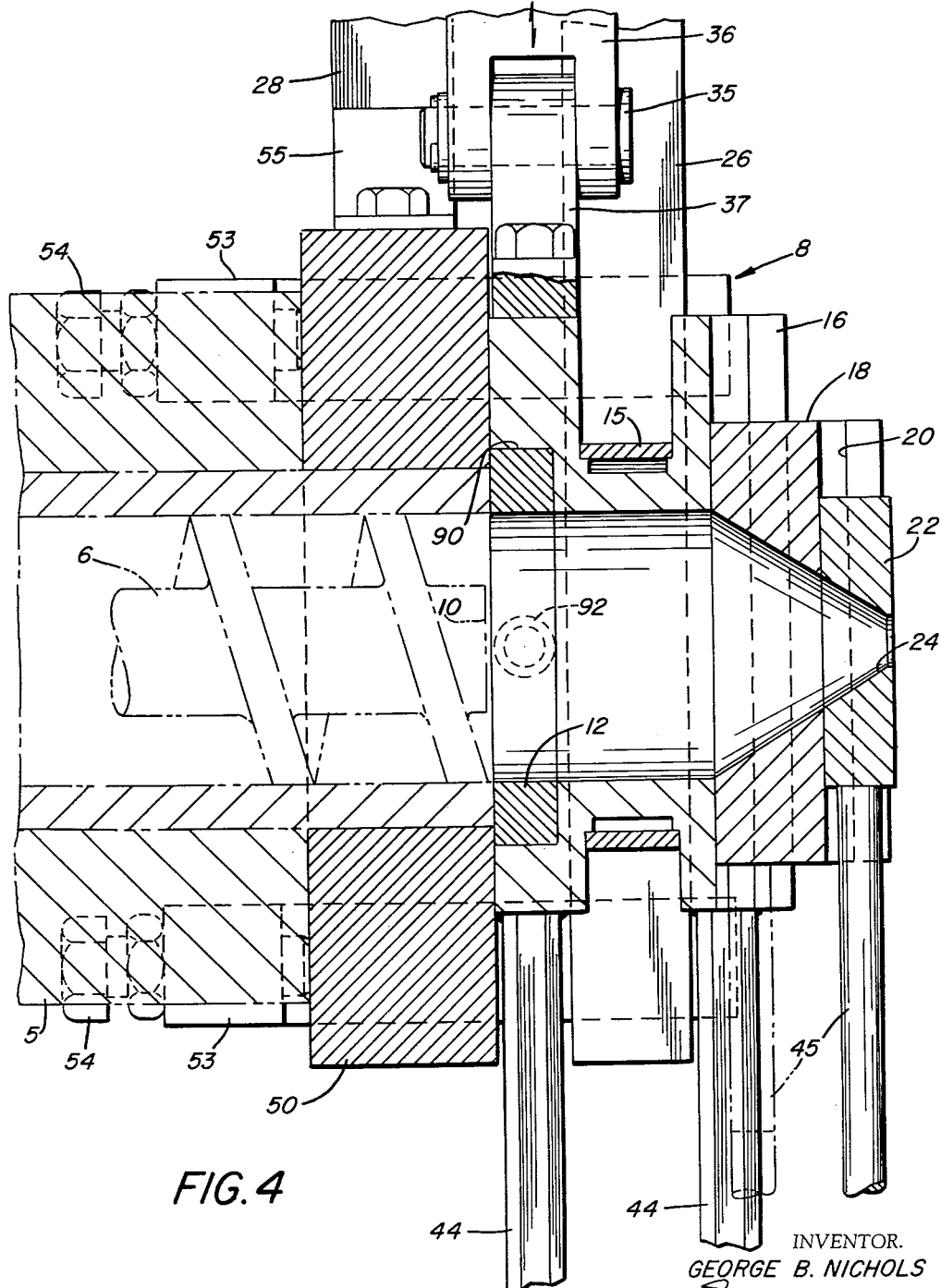
Fig. 4 is a vertical section through the die, die holder, and head on the line 4—4 of Figs. 2 and 3.

The extruder includes the jacketed barrel 5 and screw 6 which may be of any usual design. Instead of fastening the head 8 to the barrel in any usual way, it is mounted directly in front of it and is slidable vertically with respect to it. As shown in Figs. 3 and 4, the head is located immediately forward of the front 10 of the screw so that when the head is slid over the end of the barrel it shears any thread of plastic contained therein into two parts, one of which is held in the head and the other of which remains in the barrel. There is no great amount of plastic in front of the screw in the barrel, so that after such removal of the head, the barrel can easily be cleaned by merely rotating the screw.

At the rear of the head is the oval ring 12 with a circular opening. This ring is used as a filler when no spider is employed. The head 8 is provided with the annular cooling jacket 15 through which a liquid is circulated by suitable means (not shown) for heating or cooling the jacket as desirable. The front of the head is provided with the two vertical flanges 16 which are turned inwardly. The die holder 18 is provided with grooves 19 complementary to these flanges. There are grooves 20 in the die holder with complementary flanges 21 on the die 22. The die is shown with a tapering orifice 24, but it is to be understood that one or more openings of any size and shape may be provided as required.

There are four posts 25, 26, 27, and 28 which support the plate 29 (Figs. 1 and 2) on which the upper pressure cylinder 30 is mounted. This cylinder is of any usual type and is provided with inlet and outlet connections 31 and 32, and the cylinder rod 33 which moves through the center of the cylinder and extends either downwardly or upwardly therefrom. The pin 35 connects the clevis 36 at the bottom of the cylinder rod with the bracket 37 at the top of the extruder head 8.

The pressure cylinder 40 provided with inlet and outlet connections 41 and 42 is suspended from the bottom of the extruder head by the rods 44. The cylinder rod 45 extends through the cylinder and projects from either the top or the bottom, or from both.

The posts 27 and 28 rise from the enlargement 50, the front of which is flush with the front end of the barrel and fastened to it by the bolts 51. The head 8 slides on the posts 25 and 26.

The four clamps 53 hold the head tight against the end of the barrel. This is necessary because pressures of several tons are generated in the barrel. The head can be tightened against the barrel by tightening the bolts 54, the ends of which impinge against the rear face of the enlargement 50.

Figure 5:
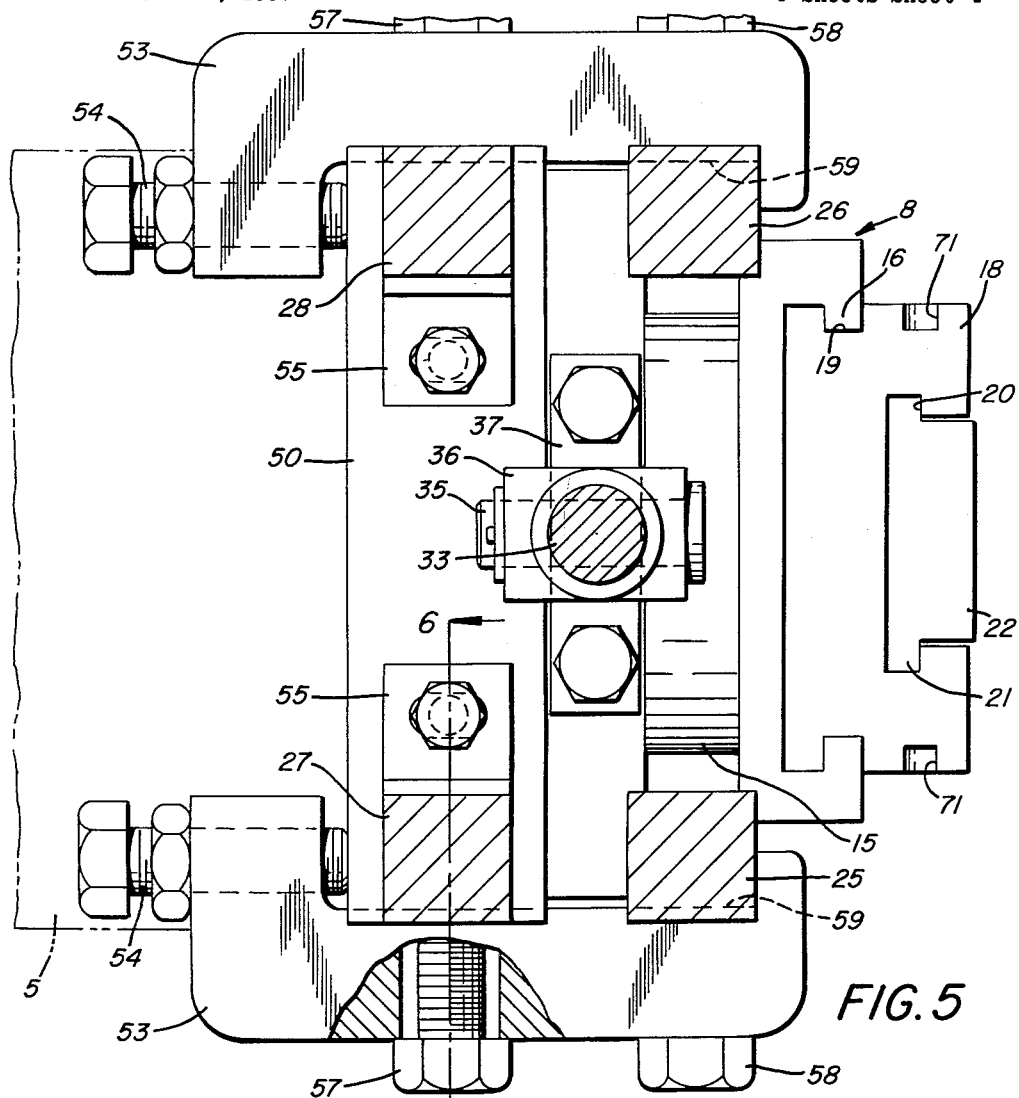
Fig. 5 is a horizontal section on the line 5—5 of Fig. 2 showing the top of the idle, die holder, and head.
Figure 6:
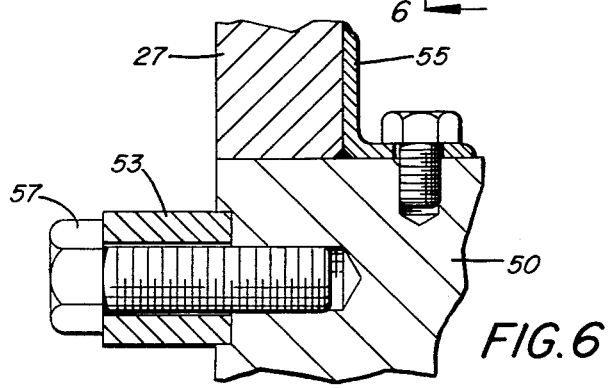
Fig. 6 is a sectional detail on the line 6—6 of Fig. 5.

Fig. 6 shows how the brackets 55 hold the posts 27 and 28 to the top of the enlargement 50. The rear bolts 57 pass loosely through holes in the clamps (Figs. 5 and 6) into the enlargement 50 to permit tightening of the head against the enlargement 50. This permits slight horizontal movement of the clamps when the bolts 57 are loosened. The bolts 58 pass through the clamps into posts 25 and 26. It is not necessary that the openings for the bolts 58 be larger than the bolts. The clamps are keyed at 59 into the sides of the two front posts 25 and 26. In this way the extrusion head is held tight against the enlargement 50 in the operating position.

Figure 7:
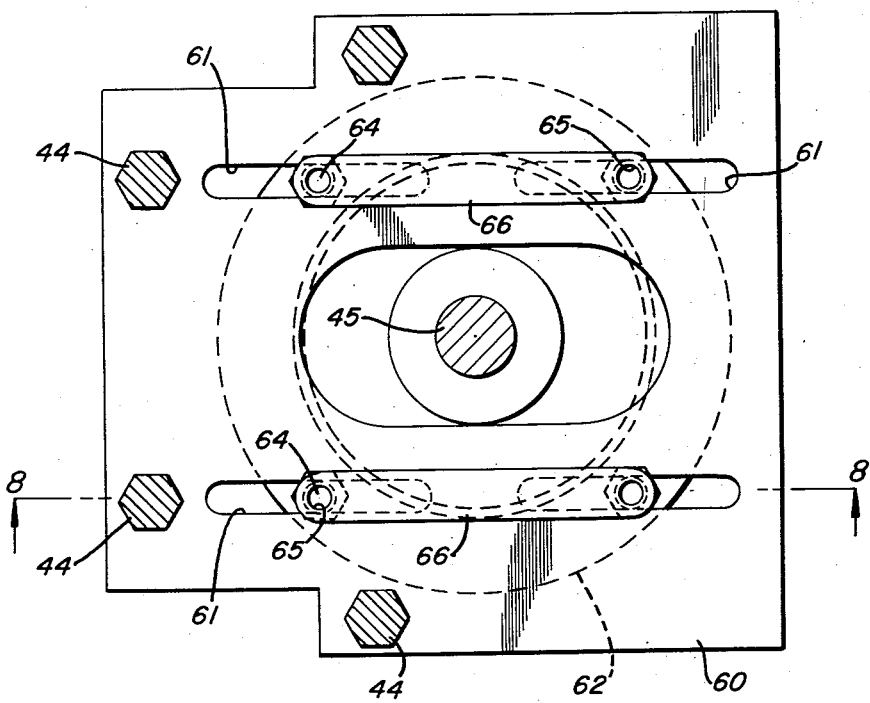
Fig. 7 is a view of the top of the lower air cylinder mounting on the line 7—7 of Fig. 1.
Figure 8:
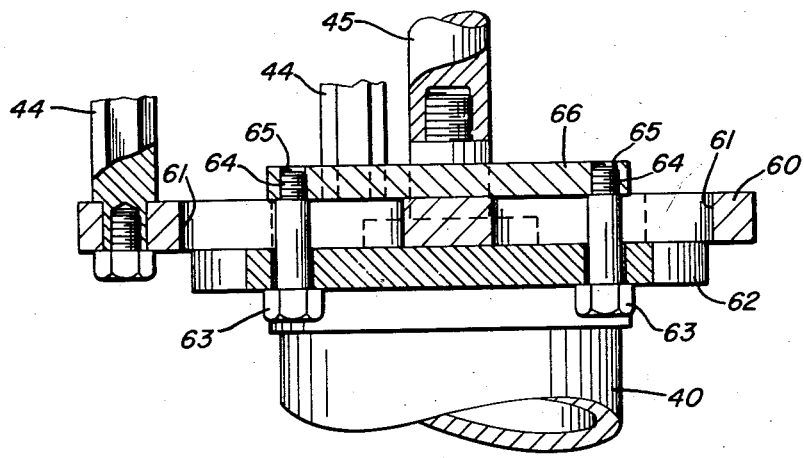
Fig. 8 is a section through the air cylinder mounting on the line 8—8 of Fig. 7.

Figs. 7 and 8 illustrate how the lower cylinder 40 is slidably mounted on the supporting plate 60. There are four slots 61 in this plate 60. There are four holes in the end plate 62 of the cylinder through which the shoulder bolts 63 extend, and their threaded ends 64 are held in the tapped openings 65 in the two cross bars 66. The shoulders are flush against the plate 66 so that the cylinder may be slid forward or backward with respect to the supporting plate 60. In this way the upper end of the cylinder rod 45 is brought directly under the die holder 18, or directly under the die 22; (both positions being illustrated in Fig. 4 where the cylinder rod is identified in both positions by the reference numeral 45). The pressure exerted by this cylinder rod is sufficient to slide the die or the die holder vertically even through a thread of extruded plastic extends from the barrel through it.

The equipment is assembled for the extrusion of plastic by lowering the head 8 (if it is in a raised position) by operation of the cylinder 30. The length of the stroke of the cylinder rod 33 is advantageously adjusted so that in its extreme lower position the center or axis of the cavity through the head is aligned with the axis of the screw 6. With the head in this lowered position the die holder 18 and die 22 are put in place.

Any suitable orifice means is slidably mounted at the front of the head. The drawings illustrate the die holder 18 and die 22, each slidably supported. The flange and groove holding means may extend the full height of the die holder and die, or only part way. It is particularly advantageous to have the die supported in the die holder by full length flanges and grooves. Then, if one die is to be replaced by another, its flanges may be slid into the die holder, under the die which has been used, and then simply by the pressure of the cylinder rod 45 it is slid in place. The thread of plastic extending through the die which has been used is sheared off, and what remains in the die may be easily removed through the back of the die when necessary.

The sheared thread of plastic is easily removed from the die after it has been raised because its rear opening is larger than its front opening, and the plastic can be pushed backwardly out of the die through its rear.

Similarly, if one die holder is to be replaced by another, the grooves 19 of the one die holder are fitted over the flanges 16 on the head, under the other die holder, and the cylinder rod replaces the one with the other. The thread of plastic is sheared off and can easily be removed from the die holder.

Figure 9:
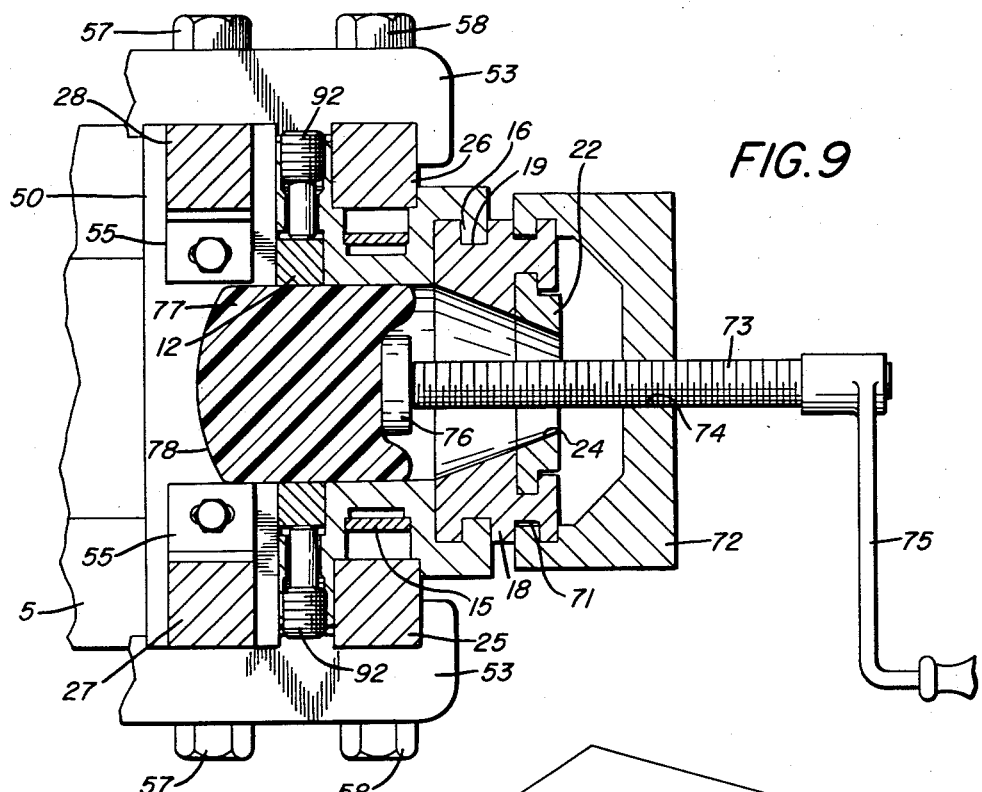
Fig. 9 is a section through the die, die holder, and head with means for removing a sheared thread of plastic through the back thereof.
Figure 11:
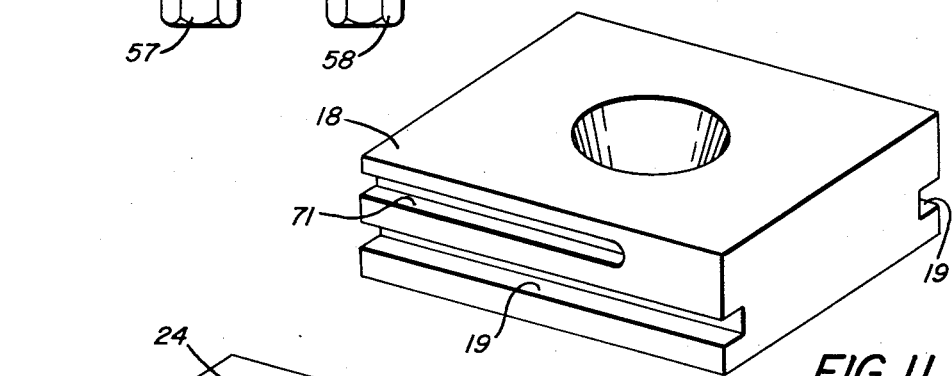
Fig. 11 is a view in perspective of a die block designed for use with a spider.
Figure 10:
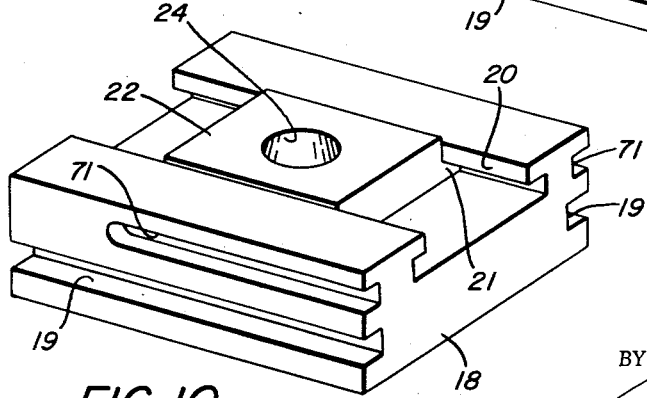
Fig. 10 is a view in perspective of the die and die holder.

If the plastic being extruded is to be replaced with a different plastic, the die and die holder may be removed from the head and separated and then separately cleaned, but preferably the head is lifted by the cylinder 30, with the die holder and die in place. Then, by special means, the plastic is pressed backwardly out of all of them in one simple operation. The equipment utilized is shown in Fig. 9, where the head is shown in lifted position.

In order to lift the head, air is introduced into the cylinder 30 and the cylinder rod is lifted and the head with it. The die holder 18 is provided with forward grooves 71 which extend to a point just below the axis of the cavity passing therethrough. The yoke 72 is provided with flanges which slide down in these grooves to the bottoms of grooves 71. The screw 73 is threaded through the opening 74 in the yoke, and is provided with the crank handle 75.

With the yoke in place, the disc 76 is placed in the orifice 24 and the screws 73 is tightened against it. By continuing to turn the crank, the plastic 77 is forced out of the rear of the equipment. When the head is lifted, the rear 78 of the plastic plug is sheared smooth. As pressure is applied, it bulges, as shown in Fig. 9, and comes out clean, in a single piece. By operating the screw 6 of the extruder, the plastic remaining in the barrel 5 is quickly forced out of its front end. The front of the screw is substantially flush with the front of the enlargement of the barrel, at least in extruders of the preferred design, so the plastic is easily forced out of the barrel by the screw's motion.

Then the motion of the crank is reversed and the yoke is removed; the head is lowered, and the extruder is ready for the treatment of a different plastic. The removal of one plastic from the equipment, and replacement of parts for continuance of the operation with a different plastic, is quickly accomplished in as little as one minute or less.

It will be noted that the lower cylinder is suspended from the head and raised and lowered with it. Therefore, the cylinder rod can operate on the die holder or die even though the head is in raised position.

Instead of using pneumatic or other such power for replacement of one die by another, this may be done manually with the yoke shown in Fig. 9, or a similar yoke. To do this, notches are provided in the top and bottom of the die holder near one edge. The screw is then threaded through the yoke against the die, and pushes it sideways.

Figs. 11 to 15 illustrate the use of a spider and mandrel in the extrusion of a plastic. Spiders of different types and shapes with mandrels of different designs are employed to form one or more openings longitudinally through extruded plastic. The arrangement shown is illustrative. It shows the spider 80 (Fig. 14) with the mandrel 81 screwed into it. The three webs 83 support the central portion of the spider concentrically in its outer ring.

The mandrel 81 tapers forwardly to the shank 82. The forward end of this shank is threaded. The opening 84 through the sleeve 85 fits over the shank 82. The nut 86 holds the sleeve in place against the pressure of the plastic exerted by the extruder screw 6.

Figures 12, 13:
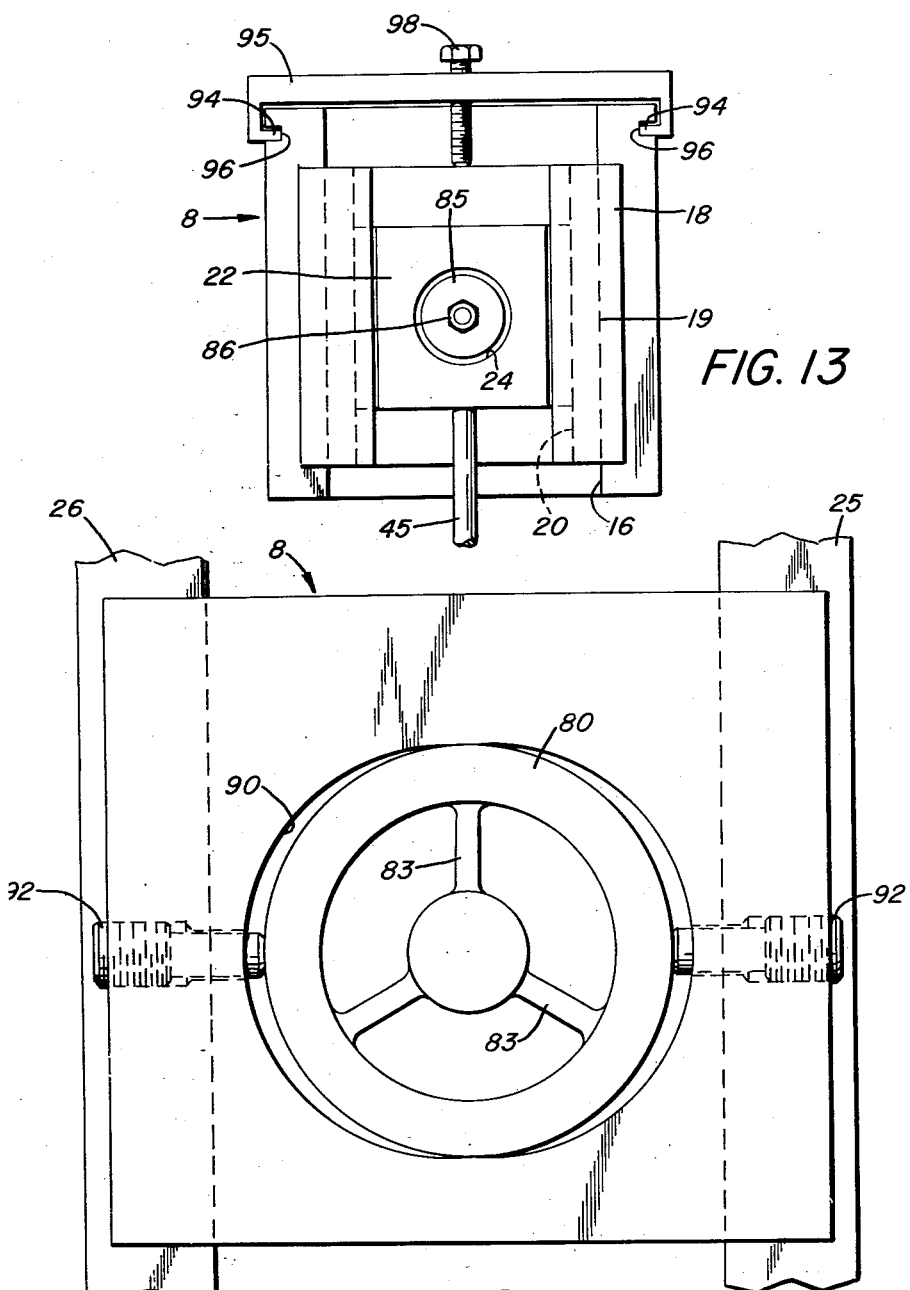
Fig. 12 is a vertical view of the rear of a spider-equipped head on the line 12—12 of Fig. 15.
Fig. 13 is a front view of the spider-equipped extruder.

The position of the mandrel in the extrusion orifice is adjusted horizontally by moving the spider by means illustrated in Fig. 12; and it is adjusted vertically by means illustrated in Fig. 13. Other means for each adjustment may be utilized. The opening 90 (Fig. 12) at the rear of the head is oval. By turning the adjusting screws 92, the spider is moved to one side or the other of the opening 90 until the mandrel is brought to the proper position in orifice 24.

In order to adjust the mandrel vertically, the inturned flanges 94 of the yoke 95 (Fig. 13) are slid into the notches 96 in the sides of the front of the head, near its top. The screw 98 contacts the top of the die holder 18. By turning the screw 98 with a wrench, the die holder is lowered; it is raised by raising the cylinder rod 45. By adjusting the height of the die by the screw 98 and cylinder rod 45, the orifice 24 is brought to the proper position about the mandrel 81 and sleeve 85.

Figure 14:
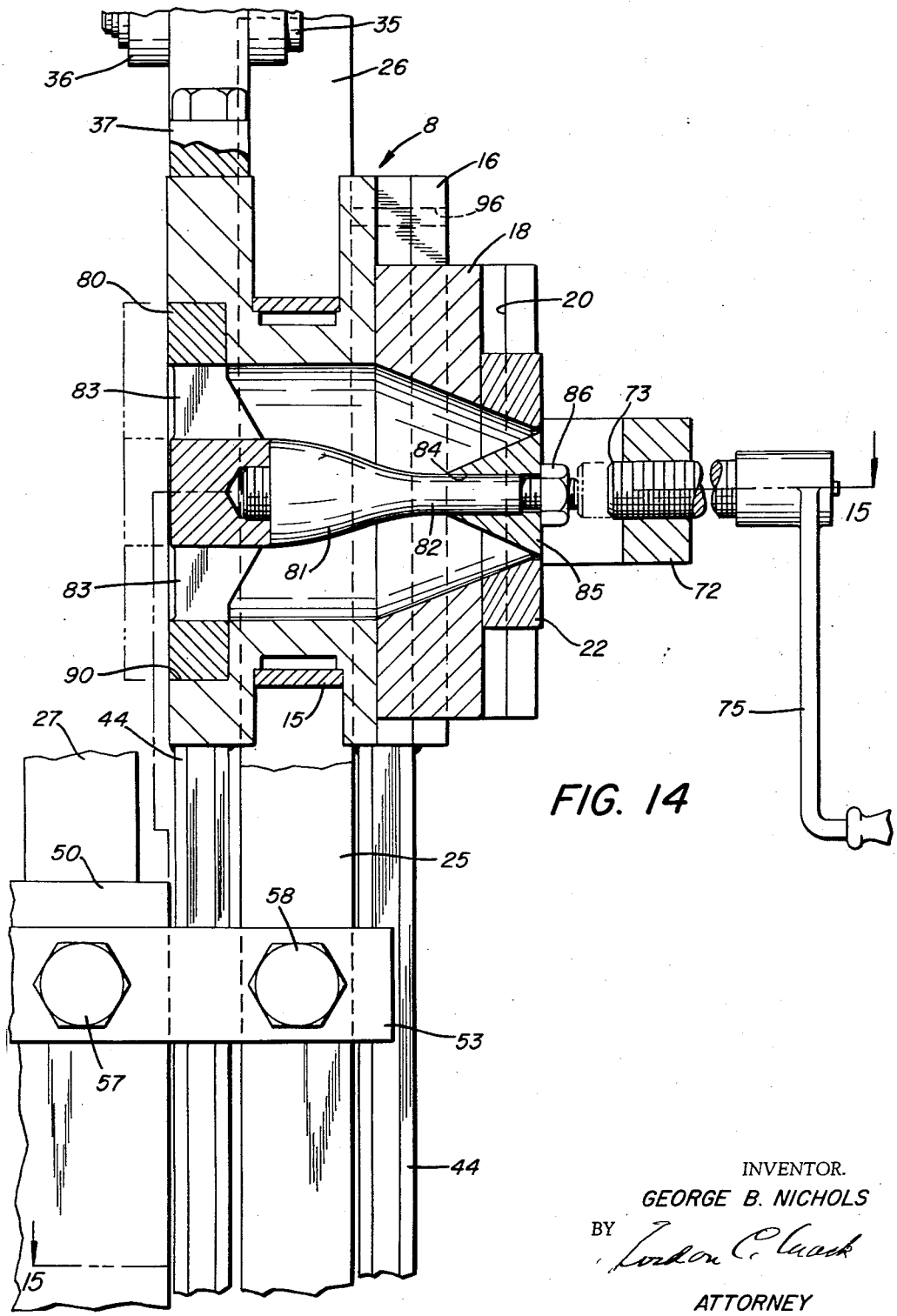
Fig. 14 is a vertical section of this head, etc. of Fig. 12, in a raised position, with spider-removal means attached.
Figure 15:
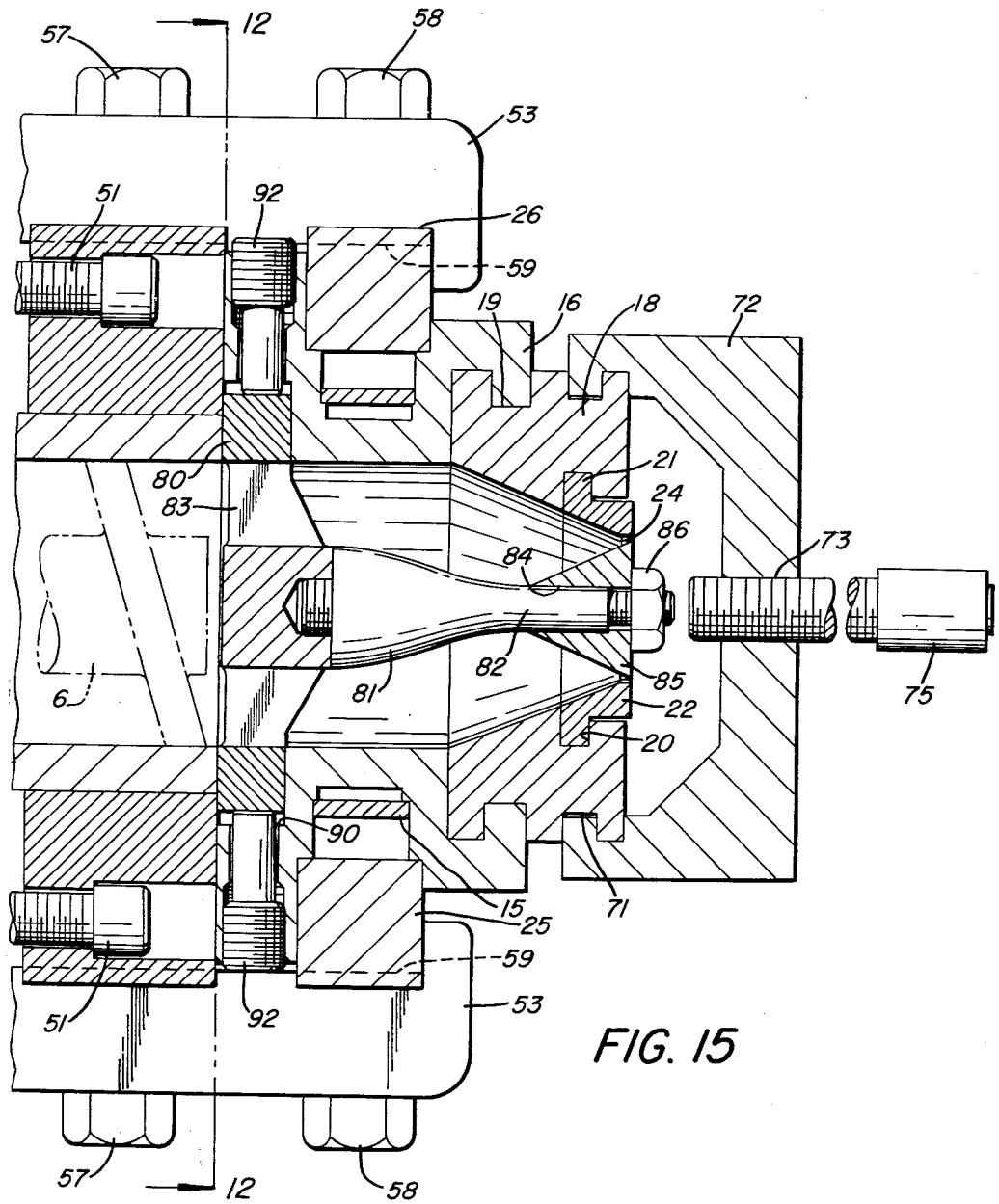
Fig. 15 is a section on the line 15—15 of Fig. 14.

In order to remove the spider, the head of the extruder is lifted by the cylinder 30, and the yoke and crank shown in Fig. 9 are placed in the grooves 93 of the header. The disc 76 is not needed because the end of the screw 74 may press directly against the end of the shank 82. Figs. 14 and 15 show the yoke in place, but no rubber or other plastic is shown in the device in order to show the arrangement most clearly. Fig. 14 shows in dot-dash lines how the screw is turned into position to exert pressure on the mandrel, and at the other end of the extruder head the spider is shown as partially removed from this head, in dot-dash lines. Continued turning of the crank 75 pushes the spider and mandrel rearwardly out of the extruder head embedded in a plug of plastic. The plastic is easily removed from them. None adheres to the cavity in the extruder head, but it is perfectly clean and ready for reuse with a different plastic, or for storage. The removal of the spider and mandrel, and cleaning of the equipment takes only a few minutes, and the equipment may be reassembled quickly for use with that spider or other extrusion means.

The foregoing is illustrative of the invention which is covered in the claims.

What I claim is:

1. A device for the extrusion of plastic which comprises an extrusion screw rotatably mounted in a barrel, an extruder head slidably mounted over the front of the barrel with flat surfaces of each in contact with one another and adapted to slide in a plane perpendicular to the axis of the screw and substantially immediately in front of the forward end of the screw for a distance sufficient to sever a thread of plastic passing therethrough, with guide means to hold the extruder head in shearing contact with the front of the barrel as it is slid over it.

2. The device of claim 1 in which die means is slidably mounted in the extruder head in a plane perpendicular to the axis of the screw.

3. The device of claim 1 in which a die is mounted in a die holder which is slidably mounted in the extruder head in a plane perpendicular to the axis of the screw.

4. The device of claim 1 in which a die is slidably mounted in a die holder, and the die holder is slidably mounted in the die head, the die and die holder each being adapted to slide in a plane perpendicular to the axis of the screw.

5. The device of claim 1 in which die means is slidably mounted in the extruder head and means is provided for sliding the die means in a plane perpendicular to the axis of the screw.

6. The device of claim 1 in which a die is slidably mounted in a die holder which is slidably mounted in the extruder head and means is provided for sliding the die and the die holder each in a plane perpendicular to the axis of the screw.

7. The device of claim 1 in which a die is slidably mounted in a die holder and the die holder is slidably mounted in the extruder head, and means supported by the extruder head is provided for sliding the die and the die holder respectively, said means being movable between the position in which it is adapted to move the die and the position in which it is adapted to move the die holder.

8. A device for the extrusion of plastic which includes an extrusion screw rotatably mounted in a barrel, an extruder head adapted to slide over the front of the barrel in a plane perpendicular to the axis of the screw and substantially immediately in front of the forward end of the screw for a distance sufficient to sever a thread of plastic passing therethrough, guide means to hold the extruder head in shearing contact with the front of the barrel as it is slid over it, and a power cylinder mounted on the barrel with its cylinder rod attached to the extruder head and adapted to slide it in said plane.

9. A device for the extrusion of plastic which includes an extrusion screw rotatably mounted in a barrel, an extruder head and die means adapted to slide over the front of the barrel in a plane perpendicular to the axis of the screw for a distance sufficient to sever a thread of plastic passing therethrough, guide means to hold the extruder head in shearing contact with the front of the barrel as it is slid over it, and a power cylinder supported by the extruder head with its cylinder rod movable in a plane perpendicular to the axis of the screw and adapted to slide said die means in the extruder head.

10. A device for the extrusion of plastic which includes an extrusion screw rotatably mounted in a barrel, an extruder head fastened to the front of the barrel, a die holder adapted to slide over the front of the extruder head and a die adapted to slide in the die holder, both the die and die holder being adapted to slide in respective planes perpendicular to the axis of the screw, a power cylinder supported by the extruder head and slidably mounted to move its cylinder rod from the plane in which the die holder is adapted to be moved to the plane in which the die is adapted to be moved and adapted to slide each in their respective planes for a distance sufficient to sever a thread of plastic passing therethrough.

11. A device for the extrusion of plastic which includes an extrusion screw rotatably mounted in a barrel, a head adapted to slide over the front of the barrel in a plane perpendicular to the axis of the screw and substantially immediately in front of the forward end of the screw, a power cylinder mounted on the barrel with its cylinder rod adapted to move in a plane perpendicular to the axis of the screw, said rod being connected with the extruder head to slide the same perpendicular to the axis of the screw, a die holder slidable in the extruder head and a die slidable in the die holder, each slidable in a plane perpendicular to the axis of the screw, a power cylinder supported by the extruder head with its cylinder rod movable between the plane in which the die holder is adapted to slide and the plane in which the die is adapted to slide, and adapted to slide each in their respective planes for a distance sufficient to sever a thread of plastic passing therethrough.

12. A device for the extrusion of plastic which includes an extrusion screw rotatably mounted in a barrel, an extruder head adapted to slide over the front of the barrel in a plane perpendicular to the axis of the screw and substantially immediately in front of the forward end of the screw for a distance sufficient to sever a thread of plastic passing therethrough, die means in the head with an orifice therein, and a spider located in the extruder head with a mandrel extending forwardly therefrom into the orifice, both the spider and the mandrel being removable through the rear of the extruder head, and means for moving the extruder head in said plane whereby the spider and mandrel and the plastic adjacent them may be removed through the rear of the extruder head when the extruder head has been moved away from the front of the barrel.

13. The device of claim 12 with the extruder head in a position in which the thread of plastic therein has been cut, which device includes removable means located in front of the opening for applying pressure backwardly through the opening to remove the spider backwardly therethrough.

14. An extruder head with an opening therethrough and means at the front thereof with an extrusion orifice therein in line with the opening, a mandrel and spider held by the head and located with the front end of the mandrel in the orifice, and means on the head for adjusting the position of the means with an extrusion orifice therein with respect thereto in one direction in a plane vertical to the axis of the spider, and separate means for adjusting the position of the spider with respect thereto in said plane and at right angles to said direction.

15. An extruder head with an opening therethrough and means at the front of the extruder head with an extrusion orifice therein in line with the opening, a mandrel and spider held by the head and located with the front end of the mandrel in the orifice, said means with the orifice therein being adjustable in one direction in a plane perpendicular to the axis of the mandrel, an elongated opening in the rear of the head, the median portion of the longer sides of the opening being in line with said opening through the head and equidistant from one another in the aforesaid direction with the spider slidably and snugly mounted between said equidistant portions of the sides, and means for adjusting the portion of the spider in the direction perpendicular to said aforesaid direction between said equidistant portions of said sides.

References Cited in the file of this patent

UNITED STATES PATENTS

| | | |
|---|---|---|
| 871,261 | Endemann | Nov. 19, 1907 |
| 1,195,576 | Garrahan | Aug. 22, 1916 |
| 1,206,150 | Slick | Nov. 28, 1916 |
| 1,768,790 | Royle | July 1, 1930 |
| 2,449,625 | Stuart | Sept. 21, 1948 |
| 2,514,211 | Carlson | July 4, 1950 |
| 2,595,210 | Clinefelter | Apr. 29, 1952 |
| 2,661,497 | Birmingham | Dec. 8, 1953 |
| 2,703,434 | Allan et al. | Mar. 8, 1955 |
| 2,720,679 | Ratliff | Oct. 18, 1955 |
| 2,728,943 | Hertz et al. | Jan. 3, 1956 |
| 2,738,549 | Pazitney et al. | Mar. 20, 1956 |
| 2,760,230 | Van Riper | Aug. 28, 1956 |
| 2,837,765 | Harvey | June 10, 1958 |

UNITED STATES PATENT OFFICE

CERTIFICATION OF CORRECTION

Patent No. 2,979,768                                    April 18, 1961

George B. Nichols

It is hereby certified that error appears in the above numbered patent requiring correction and that the said Letters Patent should read as corrected below.

Column 1, line 54, before "include" insert -- which --; column 3, line 27, for "through" read -- though --; column 4, line 6, for "screws" read -- screw --.

Signed and sealed this 29th day of August 1961.

(SEAL)
Attest:

ERNEST W. SWIDER                                    DAVID L. LADD
Attesting Officer                                       Commissioner of Patents